Patented May 11, 1926.

1,583,997

UNITED STATES PATENT OFFICE.

HERMANN REINKNECHT, OF BERLIN, GERMANY, ASSIGNOR TO MILAN DEGHENGHI, OF BADEN, NEAR WIEN, AUSTRIA.

TRANSFER PROCESS.

No Drawing. Application filed November 11, 1924. Serial No. 749,343.

Transfer processes are already known in which plates of glass, porcelain, enamel, galalith and similar inert material are covered with a preparing fluid and subsequently an original written or drawn upon with a particular ink or colour is placed upon the prepared plate. Thereby the surface on the glass-plate is subjected to a chemical action, so that either after a repeated treatment of the surface with a further developing fluid or by the direct application of colour the said surface takes on colour only at the places which have been in contact with the writing or drawing, while at the other places the colour does not adhere, so that any desired number of copies may be made from the plate.

In all known processes of the kind it is necessary to add ammonia to the ink or colour with which the original has been produced. However the ammonia is volatile and therefore the drawback arises, that new originals which have been just prepared contained a comparatively large amount of ammonia, while older originals contained only very little ammonia or none at all. The result is, that new originals act too quickly, while older originals act very deficiently only or not at all. According to the ink or colour employed or to the contents of ammonia the original had to rest on the plate for different lengths of time. The fact that ammonia is volatile is a very great drawback in the case of ribbons for producing originals on typewriting machines.

The present invention has for its object to remove this drawback by using as the ink only materials which are not volatile and therefore also act in the case of very old originals. The materials are of such a character that, only at the time of touching the original with the preparing fluid, the ammonia necessary for the above mentioned chemical transfer is formed, whereby also the advantage is gained that a particular active substance is obtained by the developed ammonia. Preferably the process according to the present invention is carried out in that the preparing fluid essentially consists of sulphocyanate of ammonia (ammonium-rhodanatum) to which is added aluminium-sulphate dissolved in water, glycerin and hydrochloric acid. Of course instead of these additions also other substances, which are known in the manufacture of the preparing fluid, may be added to the sulphocyanate of ammonia.

Suitable metallic salts or salines, preferably a little alkali-salt, such as stannate of soda, bicarbonate of soda, soda and the like, or also a solution of caustic soda, potash-lye and so forth, may be added to the ink, which otherwise may be composed in any convenient manner and need not contain ammonia.

The same addition is also made to the colour employed for ribbons, which serve for producing the original.

The effect of the process according to the present invention consists in that the mentioned chemicals, contained in the ink or colour, produce ammonia when coming into contact with the prepared surface, particularly with the sulphocyanate of ammonia, the ammonia acting in known manner on the other parts of the surface, preferably on the aluminium-sulphate and thereby produces on the plate the places for taking on the printing colour. The glycerin containing lithographic ink with a small addition of benzoate sodium may be used as the colouring substance.

I claim:—

1. A process of transferring an original prepared with a particular coloring material on to a prepared inert printing surface, comprising embodying into the said surface a non-volatile ammonium salt and embodying in the surface of said original non-volatile substance which on reaction with said ammonium salt forms the ammonia necessary for reproducing the characters of the original whenever the surface and original are placed in contact, contacting said prepared surface with the surface of said prepared original.

2. A process of transferring an original prepared with a particular coloring material on to a prepared inert printing surface, comprising embodying into the said surface ammonia sulphocyanate together with aluminum sulphate, and a small amount of glycerine and hydrochloric acid dissolved in water, and embodying in the surface of said original alkali salts for producing on reaction with said former prepared surface the ammonia necessary for reproducing the character of the original whenever the said surface and original are placed into contact, and contacting said prepared surface.

In testimony whereof I hereunto affix my signature.

HERMANN REINKNECHT.